(12) United States Patent
Kow et al.

(10) Patent No.: US 7,646,294 B2
(45) Date of Patent: Jan. 12, 2010

(54) ALARM MAPS TO FACILITATE ROOT CAUSE ANALYSIS THROUGH SPATIAL AND PATTERN RECOGNITION

(75) Inventors: Yong Ming Kow, Singapore (SG); Jakub Ja Andrzejewski, Minneapolis, MN (US); Geoffrey Ho, Minneapolis, MN (US); Sinem C. Goknur, Minneapolis, MN (US); Janet Jzx Jin, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 605 days.

(21) Appl. No.: 11/438,788

(22) Filed: May 22, 2006

(65) Prior Publication Data

US 2007/0268122 A1 Nov. 22, 2007

(51) Int. Cl.
*G08B 25/00* (2006.01)
(52) U.S. Cl. .......................... 340/525; 714/37; 715/771; 345/689; 345/441
(58) Field of Classification Search ................ 340/525, 340/628, 506, 517, 520, 825.36; 345/700, 345/440.1, 440.2, 965, 68, 440.29, 441; 715/771, 715/772, 763; 714/37
See application file for complete search history.

(56) References Cited

U.S. PATENT DOCUMENTS

| | | | |
|---|---|---|---|
| 5,955,946 A * | 9/1999 | Beheshti et al. ............. 340/506 |
| 6,577,323 B1 * | 6/2003 | Jamieson et al. ............ 715/700 |
| 6,941,362 B2 | 9/2005 | Barkai et al. ................ 709/223 |
| 6,963,339 B2 | 11/2005 | Leah et al. ................... 345/440 |
| 7,000,193 B1 * | 2/2006 | Impink et al. ................ 715/771 |
| 7,213,174 B2 * | 5/2007 | Dahlquist .................... 714/37 |
| 7,301,448 B1 * | 11/2007 | Usery et al. ................. 340/506 |
| 2004/0169654 A1 | 9/2004 | Walker et al. ................ 345/440 |
| 2005/0062741 A1 | 3/2005 | Leah et al. ................... 345/440 |
| 2005/0066277 A1 | 3/2005 | Leah et al. ................... 715/712 |
| 2005/0066289 A1 | 3/2005 | Leah et al. ................... 715/797 |
| 2005/0120273 A1 | 6/2005 | Hudson et al. ............... 714/38 |
| 2005/0278273 A1 * | 12/2005 | Uthe ............................. 707/1 |

FOREIGN PATENT DOCUMENTS

WO WO 01/02919 A1 1/2001
WO WO 02/33980 A2 4/2002

* cited by examiner

*Primary Examiner*—Davetta W Goins
*Assistant Examiner*—Hoi C Lau
(74) *Attorney, Agent, or Firm*—Kris T. Fredrick; Kermit D. Lopez; Luis M. Ortiz

(57) ABSTRACT

A computer implemented method for facilitating the root cause analysis of an event through spatial and pattern recognition. Alarms can be graphically represented in an alarm summary screen by individual colored rectangles with different luminance and patterns and are organized into categories, which are used to form logical alarm clusters that provide spatial advantage, wherein the size and color of the rectangle defines its priority and precedence. The summary screen also provides operators with strong visual cues, a play forward feature to project how alarms might evolve if particular actions are taken and a play backward feature that can replay the sequence of alarms.

14 Claims, 7 Drawing Sheets

ALARM MAPS TO FACILITATE ROOT CAUSE ANALYSIS THROUGH SPATIAL AND PATTERN RECOGNITION

TECHNICAL FIELD

Embodiments are generally related to data-processing methods and systems. Embodiments are additionally related to Root Cause Analysis. Embodiments are also related to alarm maps. Embodiments are further related to alarm analysis to facilitate the root cause of a failure situation through spatial and pattern recognition.

BACKGROUND OF THE INVENTION

Most industrial processes and systems usually contain alarm systems in which measured signals are monitored. Such industrial processes and systems can include, for example, conventional and nuclear power plants, pulp and paper plants, petroleum refineries, chemical and bio-chemical plants, and so forth. Examples of other industrial processes or systems include, for example, aerospace facilities, aircraft cockpits, medical intensive care units, and various government and military command locations. In these type of processes or systems, a large number of automated alarms are typically utilized, which are established to monitor a measured value, and to activate a warning signal if the value goes beyond an interval with a lower and an upper limit.

In process control environments, for example, operators frequently identify problems by monitoring an alarm summary screen. In large processes, it is a very complex task for the operators to obtain an overview of the failure situation since even a small fault may cause the supervision system to trigger several hundred alarms during a short interval. This stressful situation may cause the plant operators to make serious mistakes because they may be unable to sort out which alarms are important and which alarms that are not. Even a single fault may give rise to a complex alarm situation since the fault may have consequences that trigger other alarms. If, for example, a single alarm is utilized with several consequential faults, it is not a straightforward task for the operator to identify the root cause.

In general, an alarm summary screen is a text-based list of alarms. Several problems exist with this method of presentation. The operator must decipher a great deal of information by interpreting alarm data line by line. This is a time-consuming process and is not an optimal method for identifying a problem when time is critical. The number of visible alarms is limited to the size of the active display. That is, oftentimes, in an alarm flood, alarms are pushed off the screen and are no longer visible. Operators are required to scroll to find pertinent alarms and often will miss the alarm they are looking for. In fact, in the case of an alarm flood, this screen is often unmanageable and is considered an impediment to the problem.

A traditional alarm summary screen does not facilitate root cause analysis. When an alarm appears, operators are trained to look to their schematics to define the root cause. Thus, the traditional alarm summary provides only a notification that a problem has occurred and where it exists. Such alarm screens offer very little in terms of assisting the operator to define the initial cause of the problem, the consequences of the problem, and providing potential solutions.

In an effort to address the foregoing difficulties, it is believed that the use of a graphically implemented alarm map as discussed in greater detail herein can be implemented to address many of the problems with traditional alarm summary screens.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved method and system for facilitating Root Cause Analysis.

It is another aspect of the present invention to provide for a method and system that facilitates the root cause analysis of an event through spatial and pattern recognition by monitoring their alarm summary screen.

The aforementioned aspects and other objectives and advantages can now be achieved as described herein. A computer implemented method and system are disclosed for the facilitation of a root cause analysis of an event through spatial and pattern recognition. Alarms can be graphically represented with an alarm summary screen by individual colored geometric configuration (e.g., rectangles, circles, triangles, etc.), and are generally organized into categories, which are used to form logical alarm clusters that provide spatial advantage. The size, color, patterns and luminance of the geometric configuration defines its priority and precedence. The summary screen provides a user with strong visual cues. A play forward feature can also be implemented, which projects how alarms might evolve if particular actions are taken. A play backward feature can be provided, which replays the sequence of alarms.

In process control environments, it is common for the same problems to reoccur and variables that are linked will alarm concurrently or in sequence as the effects of an alarm propagate through the system. In a graphical alarm map, such as described in greater herein, these reoccurring problems may appear as reoccurring colored patterns and sequences. Thus, operators can be explicitly taught to look for patterns or sequences and these patterns and sequences can be associated with a particular root cause. Additionally, an operator is likely to learn other alarm patterns implicitly over time and can then respond accordingly.

The user interfaces disclosed herein can be implemented in the context of one or more display screens that allow operators or users to gather additional information with less dependence on schematics. If the operator is in need of gathering additional information, he or she simply slides a mouse or other pointing device over a particular geometric configuration (e.g., square, triangle, rectangle, etc.). Additional details can then beautomatically displayed in or near the particular geometric configuration and more detailed information like trend information, alarm consequence information, and recommended action information, etc can be displayed on a right side pane or left side pane based on display needs.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Figure 1:
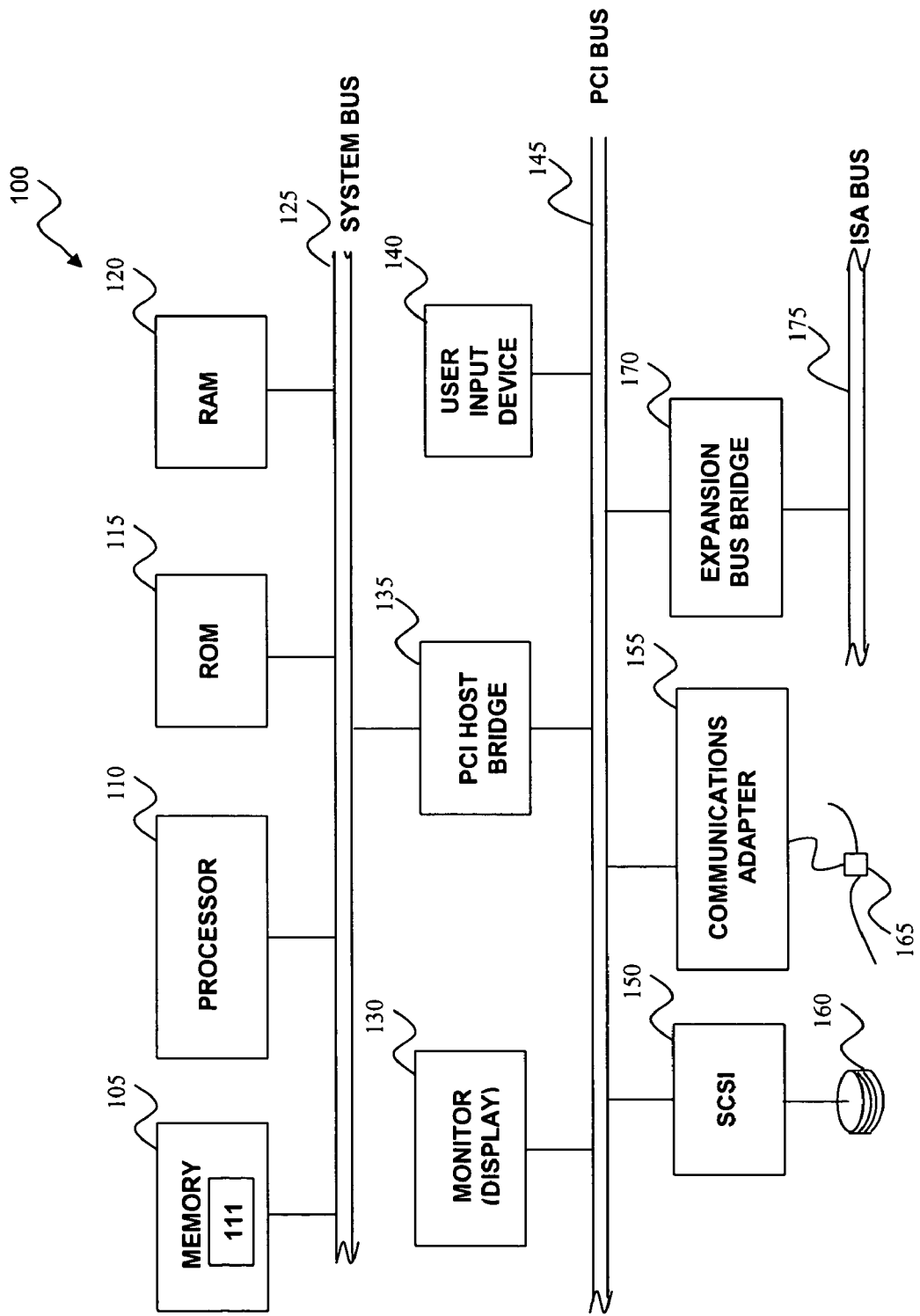
FIG. 1 illustrates a block diagram of a data-processing system which can be utilized for the generation of alarm maps to facilitate Root Cause Analysis through spatial and pattern recognition, in accordance with a preferred embodiment.

Referring to the drawings and in particular to FIG. 1, there is depicted a data-processing apparatus 100 which can be utilized for the generation of alarm maps to facilitate Root Cause Analysis in accordance with a preferred embodiment. As shown in FIG. 1, a memory 105, a processor (CPU) 110, a Read-Only memory (ROM) 115, and a Random-Access Memory (RAM) 120 are generally connected to a system bus 125 of apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-processing system thus includes CPU 110, ROM 115, and RAM 120, which are also coupled to Peripheral Component Interconnect (PCI) local bus 145 of data-processing apparatus 100 through PCI host-bridge 135. PCI Host Bridge 135 provides a low latency path through which processor 110 may directly access PCI devices mapped anywhere within bus memory and/or input/output (I/O) address spaces. PCI Host Bridge 135 also provides a high bandwidth path for allowing PCI devices to directly access RAM 120.

Also attached to PCI local bus 145 are communications adapter 155, small computer system interface (SCSI) 150, and expansion bus-bridge 170, communications adapter 155 is utilized for connecting data-processing apparatus 100 to a network 165. SCSI 150 is utilized to control high-speed SCSI disk drive 160. Expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and for interactively displaying a graphical user interface (GUI).

Note that the term "GUI" (Graphical User Interface) generally refers to a type of environment that represents programs, files, options and so forth by means of graphically displayed icons, menus, and dialog boxes on a computer monitor screen. A user can interact with the GUI to select and activate such options by pointing and clicking with a user input device such as, for example, a pointing device such as a mouse, and/or with a keyboard. A particular item can function in the same manner to the user in all applications because the GUI provides standard software routines (e.g., module 111) to handle these elements and reports the user's actions.

Figure 2:
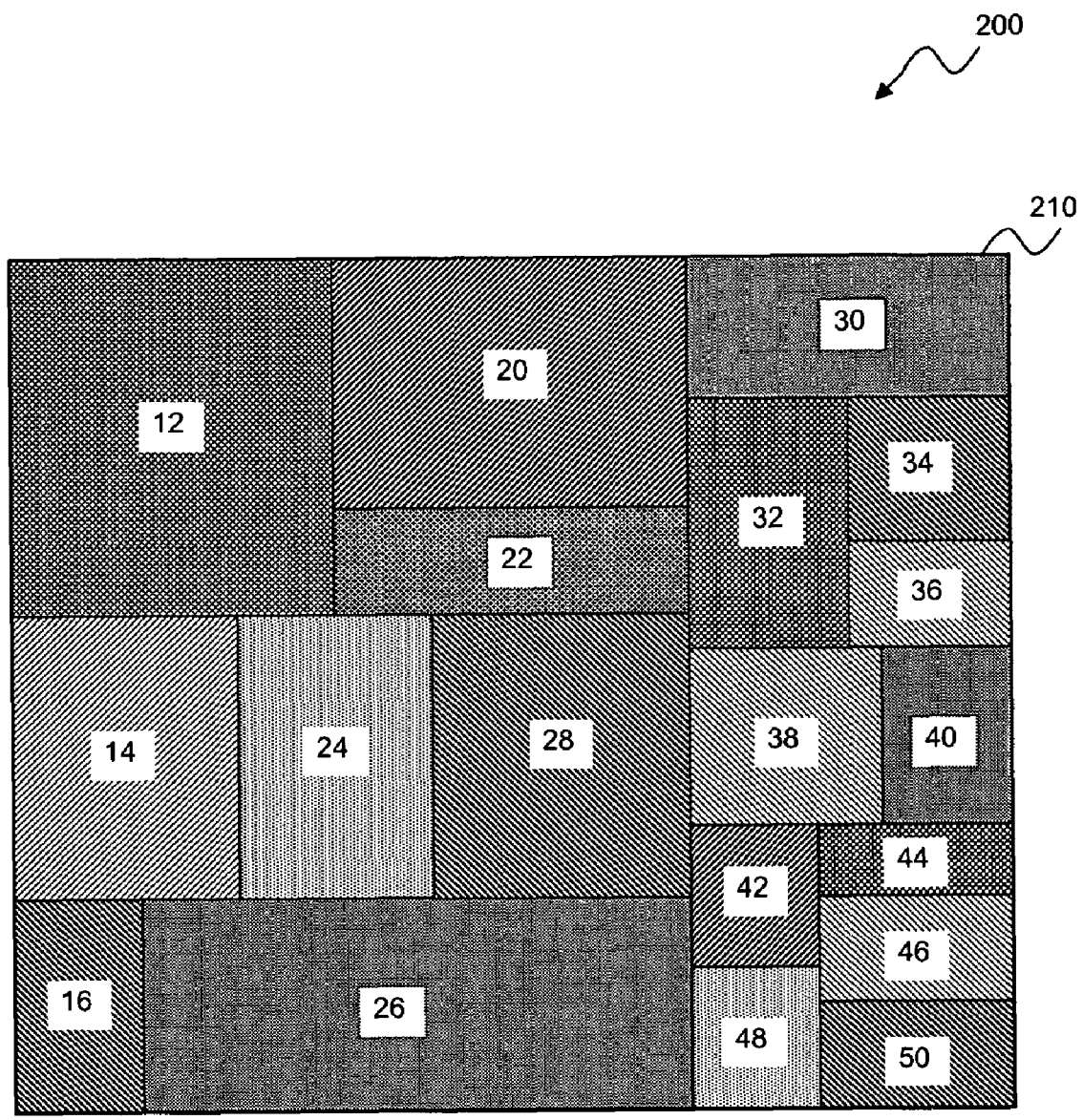
FIG. 2 illustrates a pictorial view of an alarm summary screen utilizing set of data to facilitate Root Cause Analysis, in accordance with an alternative embodiment.

Referring to FIG. 2 a pictorial view of an alarm summary screen 200 utilizing a set of data to facilitate Root Cause Analysis is depicted, in accordance with an alternative embodiment. Screen 200 can be implemented utilizing a GUI as described above and provided by a software module such as, for example, module 111 illustrated in FIG. 1. As illustrated in FIG. 2, the alarm summary screen 200 can be provided with a display grid 210 filled with bounding boxes 12 through 50, which represent the alarm summary of an event containing nineteen entries. Note that the number of entries (i.e., nineteen) depicted in FIG. 2 represents only one possible number of entries. It can be appreciated that other numbers are possible, depending upon design considerations, and a more realistic depiction might have hundreds of entries. Alarms are generally associated with these nineteen boxes 12 through 50 and the size of each of the bounding boxes 12 through 50 differs that depends on the priority of the alarms. Note that although the entries or boxes 12-50 indicated in FIG. 2 are illustrated in the context of squares or rectangular shapes, it can be appreciated that such features can be represented as any number of other possible geometric configurations (e.g., rectangles, circles, triangles, etc.).

Figure 3:
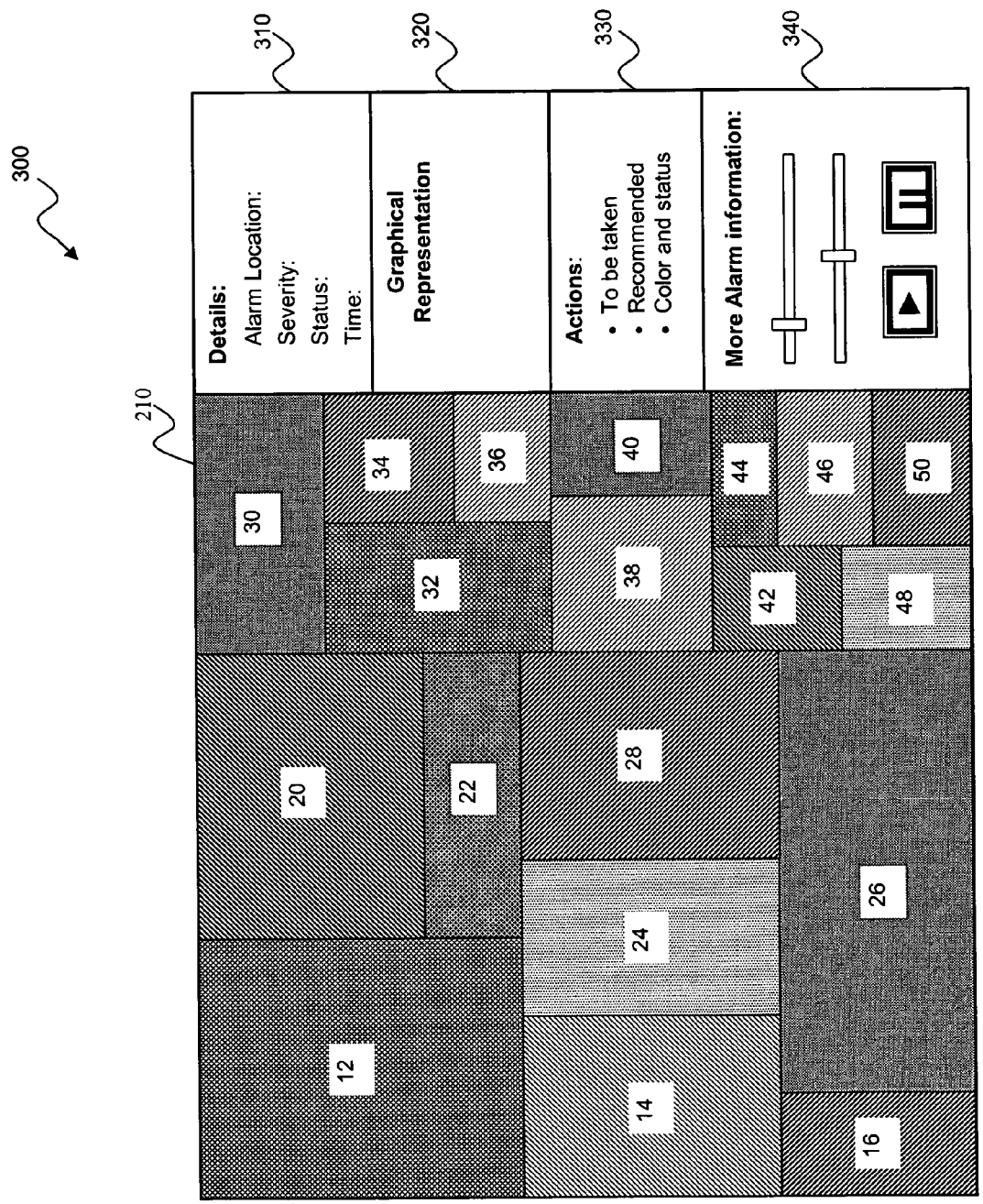
FIG. 3 illustrates a more detailed pictorial view of an alarm summary screen to facilitate Root Cause Analysis through spatial and pattern recognition, in accordance with an alternative embodiment.

Referring to FIG. 3, a more detailed pictorial view of an alarm summary screen 300 to facilitate Root Cause Analysis, through spatial and pattern recognition, is illustrated in accordance with an alternative embodiment. Screen 300 can be implemented utilizing a GUI as described above and provided by a software module such as, for example, module 111 illustrated in FIG. 1. Note that in FIGS. 2-3, identical or similar parts or elements are generally indicated by identical reference numerals. A display grid 210 is generally filled with bounding boxes 12 through 50, which the alarm summary of an event containing entries from, for example, the alarm summary screen 200 depicted in FIG. 2. Each bounding box can represent one or more alarm clusters of different failure situations in a particular process.

All alarms can be graphically represented by individual colored rectangles other geometric shapes or configurations with different patterns and luminance, and can be grouped into alarm clusters as shown and/or as bounding boxes such as the display grid 210 depicted in FIG. 2. This method of organizing alarms provides a spatial advantage. The alarm summary screen 300 provides operators with strong visual cues to diagnose a problem via the pattern recognition of alarm sequences and also provides operators some direction to attend to the alarms first, as indicated by the right side panes or sections 310-340. The alarm summary screen 300 also can provide trend information, alarm consequence information and recommended action information. The right side pane of screen 300 generally includes the details about an alarm in section 310, graphical representations in section 320, actions to be taken in section 330 and additional alarm information in section 340.

Figure 4:
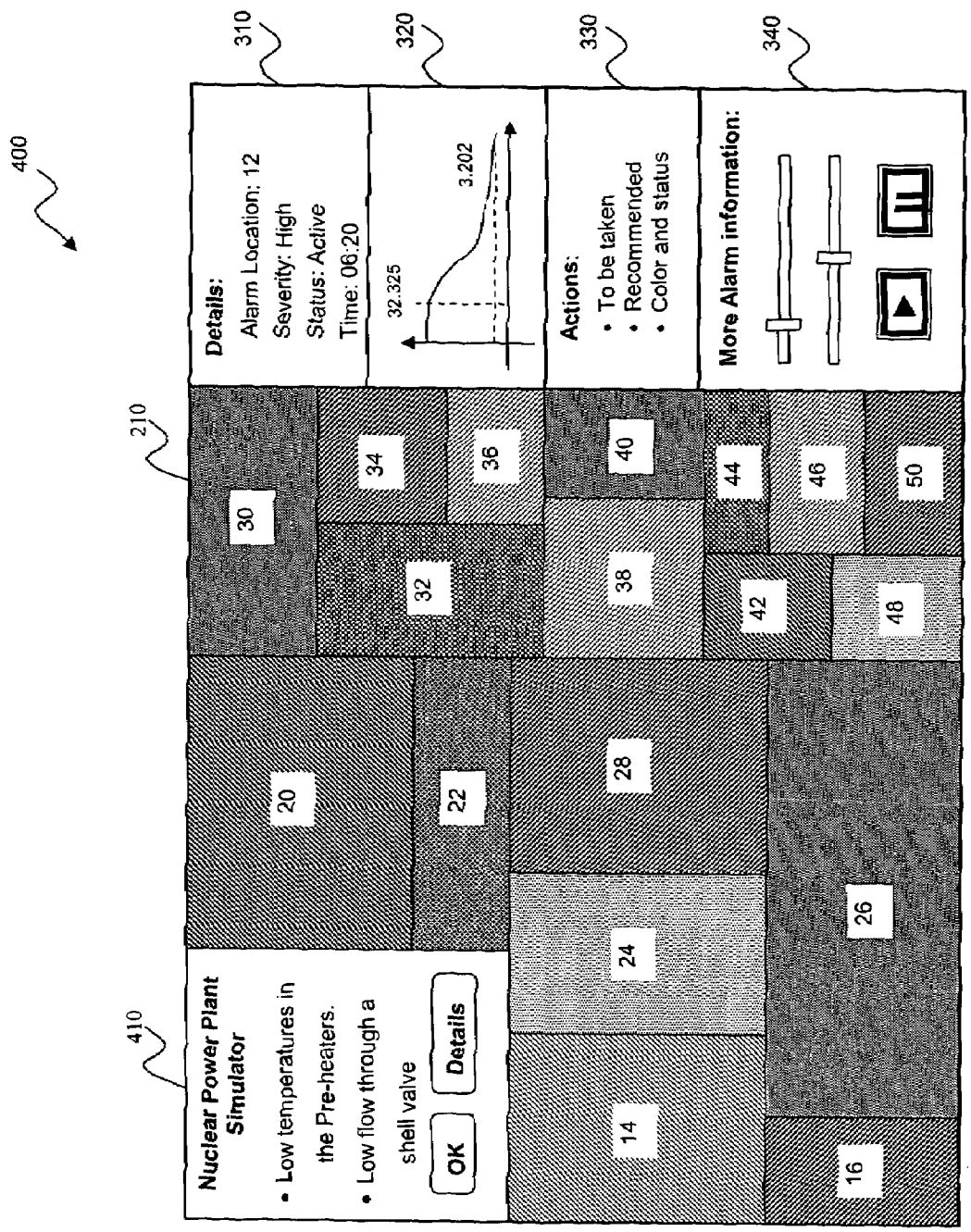
FIG. 4 illustrates a more detailed pictorial view of an alarm summary screen and its details utilizing a set of data to facilitate Root Cause Analysis through spatial and pattern recognition, in accordance with an alternative embodiment.

Referring to FIG. 4 a more detailed pictorial view of an alarm summary screen 400 utilizing a set of data to facilitate Root Cause Analysis, through spatial and pattern recognition, is illustrated in accordance with an alternative embodiment. Screen 400 can be implemented utilizing a GUI as described above and provided by a software module such as, for example, module 111 illustrated in FIG. 1. Note that in FIGS. 2-4 identical or similar parts or elements are indicated by identical reference numerals.

When a user slides a "mouse" or other pointing device (e.g., see user input device 140) over any of the bounding boxes 12 through 50, additional information regarding the alarm can be automatically made available within the rectangular grid 410. The operator or user can silence or acknowledge the alarm by "clicking" the OK command button depicted within the rectangular grid 410 with a mouse or other pointing device. When a user "clicks" the "Details" command button in the rectangular grid 410, details concerning the alarm can be displayed within section 310, and actions to be taken can be displayed within section 330. Additional information about the alarm can be displayed and/or accessed via section 340 located at the right side panes of FIG. 3. The section or pane 340 can also graphically display a playback feature that a user can access in order to replay the sequence of alarms. A play forward feature can also be provided within section 340, which can allow a user or an operator to project how alarms might evolve if particular actions are taken.

Figure 5:
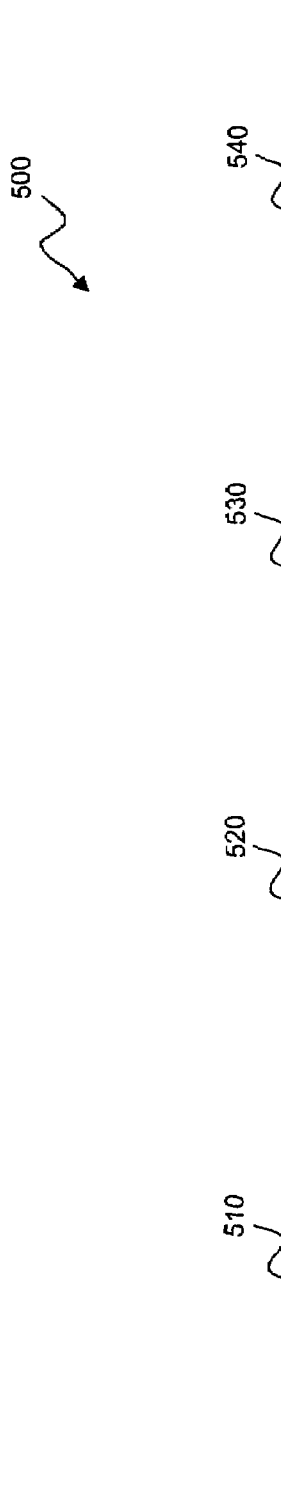
FIG. 5 illustrates an example table providing status for different color, pattern and luminance of an alarm map to facilitate Root Cause Analysis, in accordance with an alternative embodiment.

Referring to FIG. 5 an example table 500 is illustrated, which provides status for different color, pattern and luminance of an alarm map to facilitate Root Cause Analysis, in accordance with an alternative embodiment. The size, color, pattern and luminance of the alarm rectangle can define its priority and precedence. The size of each alarm can change to signal its precedence. When a user "clicks" an option color and a status icon located within the right side pane or section 330 of FIG. 3, the example table 500 can be displayed, which indicates the status of module 510 for different colors associated with alarm 520, the luminance of alarm 530, and patterns associated with the alarm 540 that can be displayed on or within the section or pane 330. By referring to the table 500, a user or operator can determine the status of the alarms simply by looking at the color, luminance and pattern of the bounding boxes 12 through 50, which are represented in FIG. 1 through the use of different cross-hatch patterns.

Figure 6:
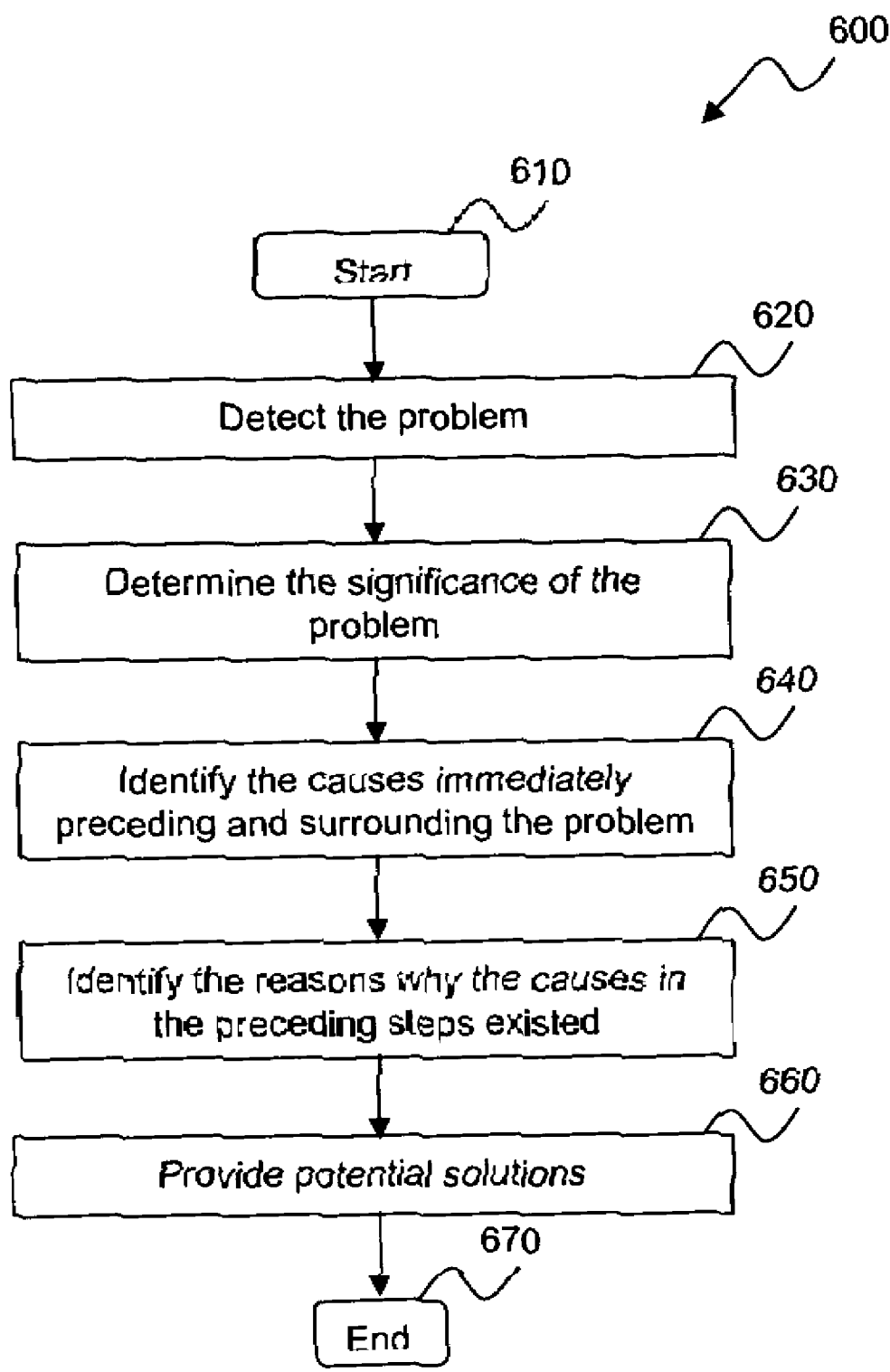
FIG. 6 illustrates a high level flow chart of operations depicting logical operation steps of root cause analysis, in accordance with an alternative embodiment.

Referring to FIG. 6, a high level flowchart is illustrated depicting a method 600, which describes logical operational steps of root cause analysis, in accordance with an alternative embodiment. Note that the process or method 600 described in FIG. 6 can be implemented in the context of a software module, such as module 111 of apparatus 100 depicted in FIG. 1. A root cause analysis operation can be initiated as indicated at block 610. Root cause analysis can be generally defined as the act of interpreting set of events and pinpointing the source causing the event. A problem can be detected as illustrated in block 620. Thereafter, the significance of the problem can be determined, as depicted in block 630. Next, the causes and reasons immediately preceding and surrounding the problem can be identified as illustrated at blocks 640 and 650. Potential solutions to overcome the problem can then be provided, as described at block 660. The process can then terminate as indicated at block 670.

Figure 7:
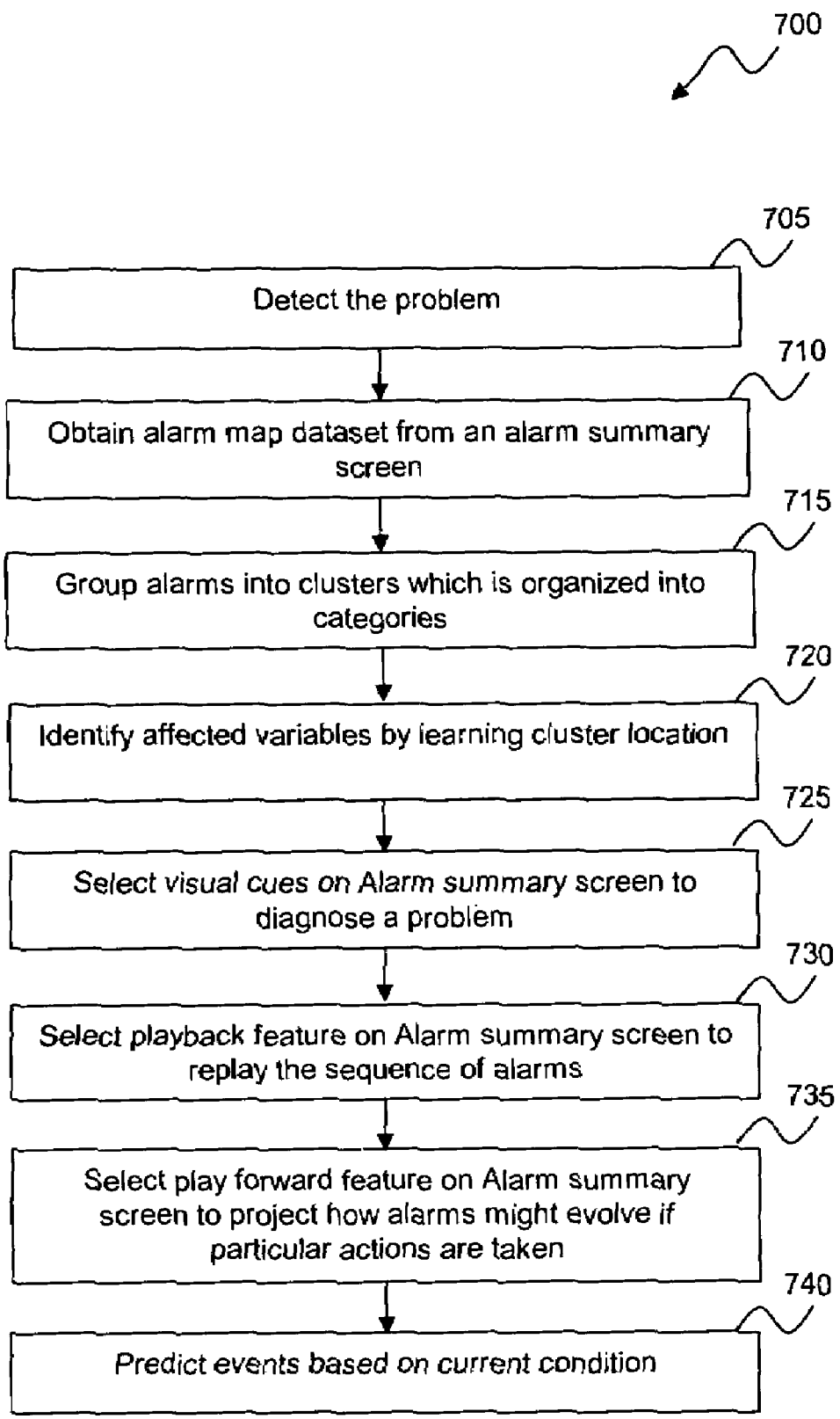
FIG. 7 illustrates a high level flow chart of operations depicting logical operation steps for alarm analysis to facilitate the root cause of a failure situation through spatial and pattern recognition, in accordance with an alternative embodiment.

Referring to FIG. 7, a high level flowchart of a method 700 is illustrated, which describes logical operational steps for implementing an alarm analysis to facilitate the root cause of a failure situation through spatial and pattern recognition, in accordance with an alternative embodiment. Note that the process or method 700 described in FIG. 7 can be implemented in the context of a software module, such as module 111 of apparatus 100 depicted in FIG. 1. A problem can be detected as depicted in block 705. As described next at block 710, an alarm map can be obtained from an alarm summary screen (e.g., screen 200, 300 and/or 400), which capitalizes on spatial vision and memory.

Alarms can be graphically represented by individually colored rectangles with different luminance and patterns and are organized into categories that operators used to form logical alarm clusters as depicted at block 715. By determining a cluster location, affected variables can be identified as depicted in block 720. The operator can select visual cues from an alarm summary screen (e.g., screen 200, 300 and/or 400) to diagnose a problem as illustrated, for example, at block 725. Playback and play forward features can also be selected to replay a sequence of alarms and to project how alarms might evolve if particular actions are taken, as depicted at blocks 730 and 735. Note that such playback and play forward features are illustrated within section 340 of FIGS. 3-4. As described next at block 740 different events can be predicted based on current condition.

By implementing the method and system disclosed herein, an alarm summary screen (e.g., screen 200, 300 and/or 400) can be generated to facilitate root cause analysis, which capitalizes on spatial vision and memory. The use of a root cause analysis approach also can provide an operator with a "glance view" of all alarms. The use of strong but simple visual cues to display information can assist an operator in quickly detecting a problem and reacting appropriately. A GUI as described herein can allow an operator to implicitly learn patterns displayed in an alarm map. Pattern recognition therefore assists an operator in quickly and efficiently diagnosing root causes.

Based on the foregoing, it can be appreciated that the use of graphical representations in the form of individual rectangles on a display screen organized into particular categories can be useful for grouping alarms into clusters. This method of representation described herein addresses many of the problems with traditional alarm summary screens. All alarms can be displayed on an active screen, and thus at no time, are active alarms hidden from the user. The main advantage of this method of representation is that it allows operators to use pattern recognition to determine a cause of groups of alarms. At a glance, operators can see patterns occurring to diagnosis of familiar problems. Thus, the operator can be constantly aware of the entire process and can more quickly determine causes of alarms. The alarm map also includes some novel playback features that allow the sequence of alarms to be played back on the map to help in identification of problems.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method, comprising:
   graphically displaying a plurality of alarms in a form of individually colored geometric configurations among a plurality of geometric configurations within an alarm summary screen displayed within a graphical user interface, said alarm summary screen including at least one area for displaying at least one of a display grid, trend information, alarm consequence information and recommended action information;
   automatically organizing said plurality of alarms into categories that are accessible to form logical alarm clusters;
   defining a priority and a precedence based on a size and a shape of said individually colored geometric configurations, thereby permitting a user to identify particular alarm data from said alarm summary screen through a use of spatial and pattern recognition;
   allowing said user to access a playback feature in order to replay a sequence of alarms; and
   permitting said user to access a playforward feature in order to project an evolution of alarms if particular actions are taken defining said priority and said precedent based on a root cause analysis; defining an area for displaying detailed alarm information when a user graphically locates a pointing device over said geometric configuration of one of said plurality of alarms.

2. The method of claim 1 wherein graphically displaying a plurality of alarms in a form of individually colored geometric configurations within an alarm summary screen, further comprises:
   displaying said plurality of alarms as an alarm map.

3. The method of claim 1 further wherein said individually colored geometric configurations among said plurality of geometric configurations comprise rectangular sections displayed within said alarm summary screen.

4. The method of claim 1 further comprising:
   automatically changing a size of at least one colored geometric configuration among said plurality of said geometric configurations in order to signal a precedence of said at least one colored geometric configuration.

5. A computer implemented system, comprising:
   a data-processing apparatus;
   a module executed by said data-processing apparatus, said module and said data-processing apparatus being operable in combination with one another to:
   graphically display a plurality of alarms in a form of individually colored geometric configurations among a plurality of geometric configurations within a alarm summary screen displayed within a graphical user interface, said alarm summary screen including at least one area for displaying at least one of a display grid, trend information, alarm consequence information and recommended action information;
   automatically organize said plurality of alarms into categories that are accessible by a user to form logical alarm clusters;
   define a priority and a precedence based on a size and a shape of said individually colored geometric configurations, thereby permitting a user to identify particular alarm data from said display screen through spatial and pattern recognition;
   allow said user to access playback feature in order to replay a sequence of alarms; and
   permit said user to access a playforward feature in order to project an evolution of alarms if particular actions are taken wherein said priority and said precedent based on a root cause analysis; define an area for displaying detailed alarm information when a user graphically locates a pointing device over said geometric configuration of one of said plurality of alarms.

6. The system of claim 5 wherein said plurality of alarms is displayable within said alarm summary screen as an alarm map.

7. The system of claim 5 wherein said individually colored geometric configurations among said plurality of geometric configurations comprise rectangular sections displayed within said display alarm summary screen.

8. The system of claim 5 wherein said data-processing apparatus and said module are further operable in combination with one another to:
   automatically alter a size of at least one colored geometric configuration among said plurality of said geometric configurations in order to signal a precedence of said at least one colored geometric configuration.

9. A computer-usable medium, said computer-usable medium embodying computer program code, said computer program code residing in a computer comprising:
   computer executable instruction media for graphically displaying a plurality of alarms in a form of individually colored geometric configurations among a plurality of geometric configurations within a display screen;
   computer executable instruction media for automatically organizing said plurality of alarms into categories that are accessible to form logical alarm clusters;
   computer executable instruction media for defining a priority and a precedence based on a size and a shape of said individually colored geometric configurations, thereby permitting a user to identify particular alarm data from said display screen through the use of spatial and pattern recognition;
   computer executable instruction media for allowing said user to access a playback feature in order to replay a sequence of alarms; and
   computer executable instruction media for permitting said user to access a playforward feature in order to project an evolution of alarms if particular actions are taken computer executable instruction media for defining said priority and said precedent based on a root cause analysis; computer executable instruction media for displaying detailed alarm information when a user graphically locates a pointing device over said geometric configuration of one of said plurality of alarms.

10. The computer-usable medium of claim 9 wherein said computer executable instruction media for graphically displaying a plurality of alarms in a form of individually colored geometric configurations within a display screen, further comprises:
    computer executable instruction media for displaying said plurality of alarms as an alarm map.

11. The computer-usable medium of claim 9 wherein said individually colored geometric configurations among said plurality of geometric configurations comprise rectangular sections displayed within said display screen.

12. The computer-usable medium of claim 9 further comprising:
    computer executable instruction media for automatically changing a size of at least one colored geometric configuration among said plurality of said geometric configurations in order to signal a precedence of said at least one colored geometric configuration.

13. The computer-usable medium of claim 9 wherein each of said computer executable instruction media comprises signal-bearing media.

14. The computer-usable medium of claim 13 wherein said signal-bearing media comprises transmission media or recordable media.

* * * * *